United States Patent
Bennett, Jr. et al.

(10) Patent No.: US 10,393,103 B2
(45) Date of Patent: Aug. 27, 2019

(54) COMPRESSOR WITH DUAL BIMORPH SYNTHETIC JET ASSEMBLIES

(71) Applicant: General Electric Company, Schenectady, NY (US)

(72) Inventors: Grover Andrew Bennett, Jr., Esperance, NY (US); Matthew Patrick Boespflug, Clifton Park, NY (US); Seyed Gholamali Saddoughi, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 15/289,471

(22) Filed: Oct. 10, 2016

(65) Prior Publication Data

US 2018/0100494 A1 Apr. 12, 2018

(51) Int. Cl.
| | | |
|---|---|---|
| F04B 43/04 | (2006.01) | |
| F04B 45/02 | (2006.01) | |
| F04B 17/00 | (2006.01) | |
| F04B 35/04 | (2006.01) | |
| F04B 43/00 | (2006.01) | |
| F04B 41/06 | (2006.01) | |
| F04B 45/047 | (2006.01) | |

(52) U.S. Cl.
CPC .......... *F04B 45/024* (2013.01); *F04B 17/003* (2013.01); *F04B 35/04* (2013.01); *F04B 41/06* (2013.01); *F04B 43/0045* (2013.01); *F04B 43/0054* (2013.01); *F04B 43/04* (2013.01); *F04B 43/046* (2013.01); *F04B 45/047* (2013.01)

(58) Field of Classification Search
CPC ...... F04B 45/024; F04B 17/003; F04B 35/04; F04B 43/0045; F04B 43/0054; F04B 43/04; F04B 43/046
See application file for complete search history.

(56) References Cited

U.S. PATENT DOCUMENTS

| 6,722,581 B2 | 4/2004 | Saddoughi |
|---|---|---|
| 7,055,329 B2 | 6/2006 | Martens et al. |

(Continued)

FOREIGN PATENT DOCUMENTS

| EP | 2 549 105 A1 | 1/2013 |
|---|---|---|
| EP | 2 778 415 A1 | 9/2014 |
| JP | H06-147104 A | 5/1994 |

OTHER PUBLICATIONS

Xinqian Zheng et al., "Flow Control of Annular Compressor Cascade by Synthetic Jets", Journal of Turbomachinery, vol. 130, Issue: 2, pp. 7.

(Continued)

*Primary Examiner* — Patrick Hamo
(74) *Attorney, Agent, or Firm* — Baker Hughes Patent Organization

(57) ABSTRACT

A compressor includes a plurality of synthetic jet assemblies. Each synthetic jet assembly of the plurality of synthetic jet assemblies is in fluid communication with at least one other synthetic jet assembly of the plurality of synthetic jet assemblies. Each synthetic jet assembly of the plurality of synthetic jet assemblies includes a first side plate and a second side plate. The first side plate includes a first bimorph piezoelectric structure. The second side plate includes a second bimorph piezoelectric structure. The first side plate and the second side plate define a first fluid cavity extending between the first side plate and the second side plate.

20 Claims, 6 Drawing Sheets

(56) References Cited

U.S. PATENT DOCUMENTS

| | | |
|---|---|---|
| 7,967,258 B2 | 6/2011 | Smith et al. |
| 7,990,705 B2 | 8/2011 | Bult et al. |
| 8,136,767 B2 | 3/2012 | Cueman et al. |
| 8,348,200 B2 | 1/2013 | Saddoughi et al. |
| 8,881,994 B2 | 11/2014 | Wetzel et al. |
| 9,239,039 B2 | 1/2016 | Herr et al. |

OTHER PUBLICATIONS

Gravatt, L., "Resonance-based low-frequency synthetic jet actuator modeling, design and testing," Master's Thesis, Department of Aerospace Engineering, University of Maryland, 2006 (89 pgs.).

Extended European Search Report and Opinion issued in connection with corresponding EP Application No. 17195182.5 dated Mar. 5, 2018.

COMPRESSOR WITH DUAL BIMORPH SYNTHETIC JET ASSEMBLIES

BACKGROUND

The present disclosure relates generally to a compressor and, more specifically, to a compressor including a plurality of dual bimorph synthetic jet assemblies.

At least some known compressors include friction generating moving parts. More specifically, compressors typically include friction generating parts such as pistons, bearings, and a motor. The motor drives one or more reciprocating pistons that compress a fluid introduced or drawn into the compressor. The motor and pistons include and are coupled together by bearings. These friction generating moving parts limit the service life of the typical compressor. Furthermore, the friction generating moving parts limit the configurations in which the typical compressor can be packaged. For example, pistons and an engine included in a typical compressor limit geometry and size of the compressor.

BRIEF DESCRIPTION

In one aspect, a compressor is provided. The compressor includes a plurality of synthetic jet assemblies. Each synthetic jet assembly of the plurality of synthetic jet assemblies is in fluid communication with at least one other synthetic jet assembly of the plurality of synthetic jet assemblies. Each synthetic jet assembly of the plurality of synthetic jet assemblies includes a first side plate and a second side plate. The first side plate includes a first bimorph piezoelectric structure. The second side plate includes a second bimorph piezoelectric structure. The first side plate and the second side plate define a first fluid cavity extending between the first side plate and the second side plate.

In another aspect, a compressor is provided. The compressor includes a first flow control orifice assembly and a first synthetic jet assembly. The first synthetic jet assembly includes a first side plate including a first bimorph piezoelectric structure and a second side plate including a second bimorph piezoelectric structure. The first side plate and the second side plate define a first fluid cavity extending between the first side plate and the second side plate. The first synthetic jet assembly further includes a first end plate defining a first orifice cavity configured to receive the first flow control orifice assembly. The first flow control orifice assembly is coupled in fluid communication with the first fluid cavity.

In yet another aspect, a method for compressing a fluid is provided. The method includes drawing the fluid into a first fluid cavity by expanding the first fluid cavity of a first synthetic jet assembly. The method further includes compressing the first fluid cavity of the first synthetic jet assembly to compress the fluid. Expanding a second fluid cavity of a second synthetic jet assembly draws the fluid into the second fluid cavity. Compressing the second fluid cavity of the second synthetic jet assembly compresses the fluid.

DRAWINGS

These and other features, aspects, and advantages of the present disclosure will become better understood when the following detailed description is read with reference to the accompanying drawings in which like characters represent like parts throughout the drawings, wherein.

Figure 1:
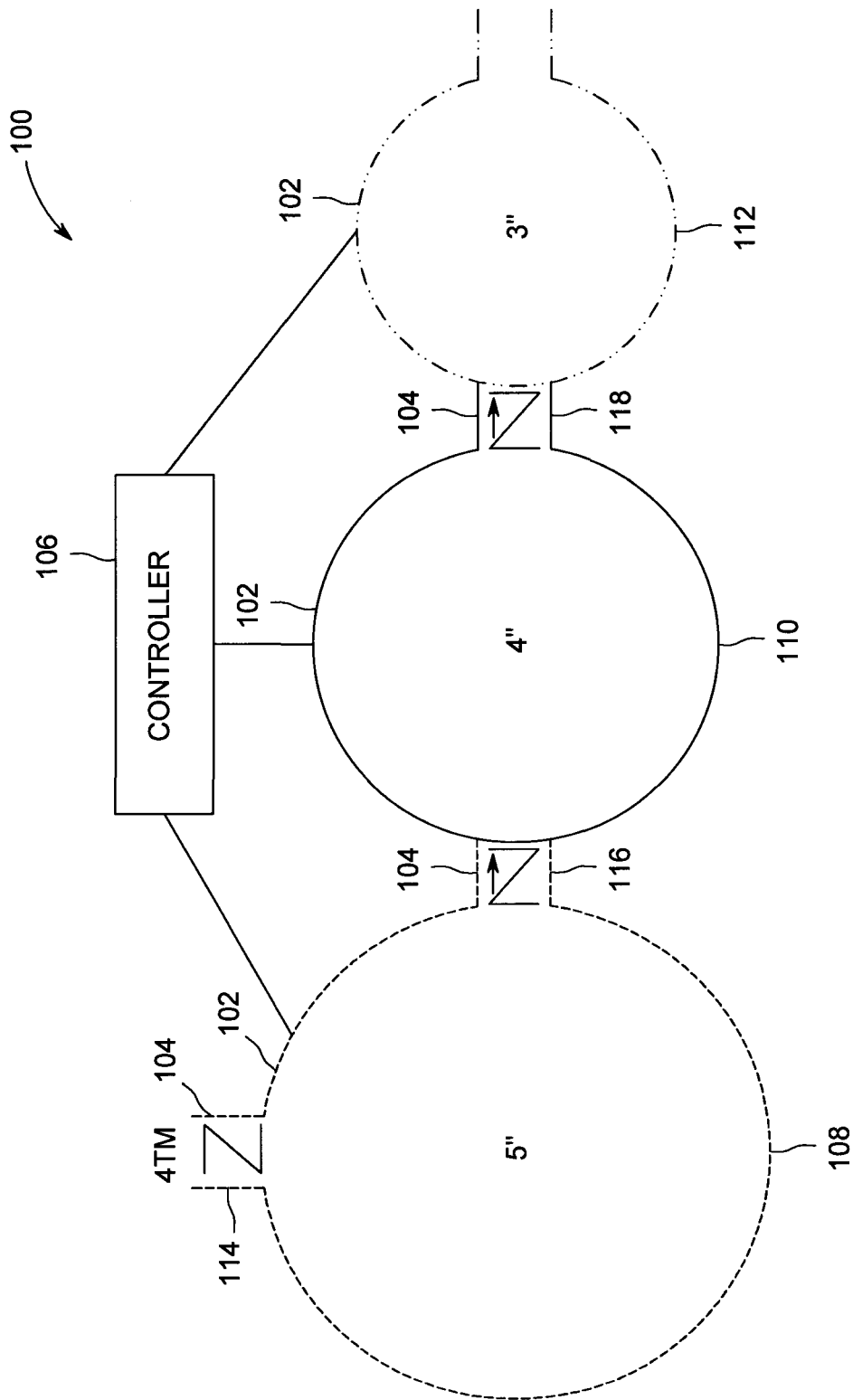
FIG. 1 is a schematic illustration of an exemplary compressor including a plurality of dual bimorph synthetic jet assemblies.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Some embodiments involve the use of one or more electronic or computing devices such as a controller. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

Embodiments of the present disclosure relate to a compressor including two or more dual bimorph synthetic jet assemblies in fluid communication. More specifically, each synthetic jet assembly draws in, compresses, and expels a fluid using at least two plates including dual bimorph piezoelectric structures that when actuated function in a bellows like manner. Actuating the dual bimorph piezoelectric structures causes a fluid cavity to expand and contract that provides for the drawing in, compression, and expelling of the fluid. Flow control devices, such as, flow control valve assemblies and/or flow control orifice assemblies are used to facilitate operation of the compressor. The dual bimorph synthetic jet assemblies allow for increased service life of the compressor in comparison to compressors including moving and friction generating parts such as motors and pistons. Furthermore, the dual bimorph synthetic jet assemblies allow for an increased number of configurations in which the compressor can be packaged in comparison to compressors including moving and friction generating parts such as motors and pistons.

FIG. 1 is a schematic illustration of an exemplary compressor 100 including a plurality of synthetic jet assemblies 102. Each synthetic jet assembly 102 is a dual bimorph synthetic jet assembly. As described in greater detail with reference to FIG. 2, each synthetic jet assembly 102 includes a plurality of dual bimorph piezoelectric structures that, when actuated, cause synthetic jet assembly 102 to draw in a fluid, compress the fluid, and expel the fluid in a bellows like manner. Compressor 100 further includes a plurality of flow control valves 104, e.g., and without limitation, check valves. Flow control valves 104 facilitate flow of the fluid through successive synthetic jet assemblies 102. For example, flow control valves 104 prevent backflow of the fluid through compressor 100.

Compressor 100 further includes a controller 106. Controller 106 is electrically coupled to each synthetic jet assembly 102. Controller 106 actuates the plurality of dual bimorph piezoelectric structures of synthetic jet assemblies 102 to draw in, compress, and expel the fluid from synthetic jet assembly 102 through actuation of the dual bimorph piezoelectric structures. As described in greater detail with reference to FIG. 4, controller 106 actuates the dual bimorph piezoelectric structures of each synthetic jet assembly 102 at least partially out of phase with each other synthetic jet assembly 102 to successively compress the fluid.

In the exemplary embodiment, compressor 100 includes a first synthetic jet assembly 108, a second synthetic jet assembly 110, and a third synthetic jet assembly 112. First synthetic jet assembly 108 is coupled to a first check valve 114. First check valve 114 is in fluid communication with a fluid source. For example, and without limitation, first check valve 114 is open to the atmosphere. First synthetic jet assembly 108 draws in the fluid through first check valve 114. First check valve 114 is oriented to facilitate flow of the fluid from the fluid source and into first synthetic jet assembly 108. This orientation further restricts flow of the fluid from first synthetic jet assembly 108 to the fluid source. First check valve 114 prevents backflow of the fluid within compressor 100. First synthetic jet assembly 108 is further coupled to a second check valve 116. Second check valve 116 is further coupled to second synthetic jet assembly 110. First synthetic jet assembly 108 expels compressed fluid through second check valve 116. Second check valve 116 is oriented to facilitate flow of the fluid from first synthetic jet assembly 108 and into second synthetic jet assembly 110. This orientation further restricts flow of the fluid from second synthetic jet assembly 110 to first synthetic jet assembly 108. Second check valve 116 prevents backflow of the fluid within compressor 100. Second synthetic jet assembly 110 is further coupled to a third check valve 118. Third check valve 118 is further coupled to third synthetic jet assembly 112. Second synthetic jet assembly 110 expels compressed fluid through third check valve 118. Third check valve 118 is oriented to facilitate flow of the fluid from second synthetic jet assembly 110 and into third synthetic jet assembly 112. This orientation further restricts flow of the fluid from third synthetic jet assembly 112 to second synthetic jet assembly 110. Third check valve 118 prevents backflow of the fluid within compressor 100. Third synthetic jet assembly 112 expels the compressed fluid from compressor 100.

In the exemplary embodiment, first synthetic jet assembly 108 compresses the fluid and feeds the compressed fluid into second synthetic jet assembly 110. Second synthetic jet assembly 110 further compresses the fluid and feeds the further compressed fluid into third synthetic jet assembly 112. Third synthetic jet assembly 112 further compresses the fluid and expels the further compressed fluid. Synthetic jet assemblies 102 are in a serial relationship and reduce in size from first synthetic jet assembly 108 to third synthetic jet assembly 112. As described herein in greater detail with reference to FIG. 2, each synthetic jet assembly 102 defines a fluid cavity in which the fluid is compressed. The fluid cavity is defined by two plates, each including a dual bimorph piezoelectric structure. The plates are configured to draw in, compress, and expel the fluid from the fluid cavity, and such plates are described further below with respect to FIG. 2.

First synthetic jet assembly 108 has a first fluid cavity having a first volume, second synthetic jet assembly 110 has a second fluid cavity having a second volume, and third synthetic jet assembly 112 having a third volume. The first volume is larger than the second volume, and the second volume is larger than the third volume. Each synthetic jet assembly 102 draws in the fluid at a progressively higher initial pressure thereby producing a steadily increasing pressure as the fluid moves from first synthetic jet assembly 108 to second synthetic jet assembly 110 and from second synthetic jet assembly 110 to third synthetic jet assembly 112.

In other embodiments, compressor 100 has alternative configurations including synthetic jet assemblies 102. Compressor 100 can include any number of synthetic jet assemblies 102 greater than two. Compressor 100 can further include synthetic jet assemblies 102 coupled in only a serial relationship, coupled in a parallel relationship, or include synthetic jet assemblies 102 in a combination of serial relationships and parallel relationships. Compressor 100 can include synthetic jet assemblies 102 of varying sizes. Compressor 100 can include one or more synthetic jet assemblies 102 having a greater volume following one or more synthetic jet assemblies 102 having a lesser volume. Compressor 100 can be arranged in many configurations to fit a wide variety of applications. Compressor 100 is scalable both in output pressure by increasing the length of the sequence of synthetic jet assemblies 102 and is scalable in total flow volume by adding parallel sequences of synthetic jet assemblies.

Figure 2:
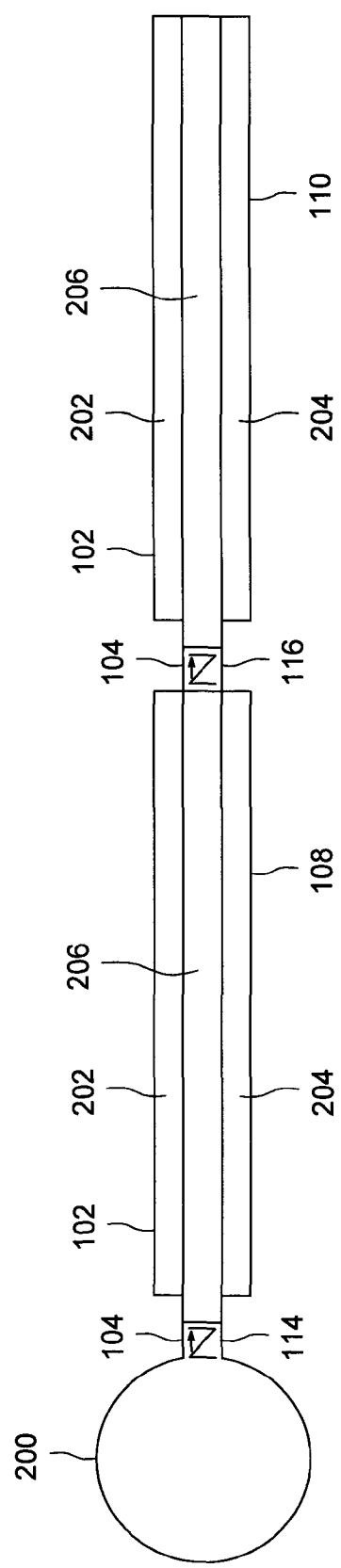
FIG. 2 is a partial detail schematic view of the compressor shown in FIG. 1.

FIG. 2 is a partial detail schematic view of compressor 100 (shown in FIG. 1). First synthetic jet assembly 108 is coupled to first check valve 114. First check valve 114 is further coupled to a fluid source 200. Fluid source 200 is any source of a fluid, for example, and without limitation, a gas or liquid. For example, and without limitation, fluid source 200 is the atmosphere, a reservoir, a tank, a pipe, or the like. Fluid source 200 can contain the fluid under pressure. Fluid source 200 can be a component of another device such as a turbomachine. First synthetic jet assembly 108 is coupled to second check valve 116. Second check valve 116 is in turn coupled to second synthetic jet assembly 110.

Each synthetic jet assembly 102 includes a first side plate 202 and a second side plate 204. Second side plate 204 is positioned opposite first side plate 202. As described in greater detail with reference to FIG. 3, first side plate 202 and second side plate 204 both include a dual bimorph piezoelectric structure that, when actuated, cause the side plate to deform. Deforming first side plate 202 and second side plate 204 cause synthetic jet assembly 102 to expand and contract a fluid cavity 206 defined by first side plate 202 and second side plate 204. In the exemplary embodiment, first plate 202 and second plate 204 are circular disks. In alternative embodiments, first side plate 202 and second side plate 204 are other shapes, for example, and without limitation, first side plate 202 and second side plate 204 are rectangular. The combination of first plate 202 and second plate 204 operate in a bellows like manner to allow synthetic jet assembly 102 to draw in, compress, and expel the fluid.

In the exemplary embodiment, first synthetic jet assembly 108 includes first plate 202 and second plate 204, each of plates 202 and 204 having diameters of approximately five inches (12.7 centimeters). Second jet assembly 110 includes first plate 202 and second plate 204, each of plates 202 and 204 having diameters of approximately four inches (10.16 centimeters). Third synthetic jet assembly 112 (shown in FIG. 1) includes first plate 202 and second plate 204, each of plates 202 and 204 having diameters of approximately three inches (7.62 centimeters). In alternative embodiments, synthetic jet assemblies 102 of compressor 100 have various other configurations including first plates 202 and second plates 204 having any diameters that enable operation of compressor 100 as described herein.

Figure 3:
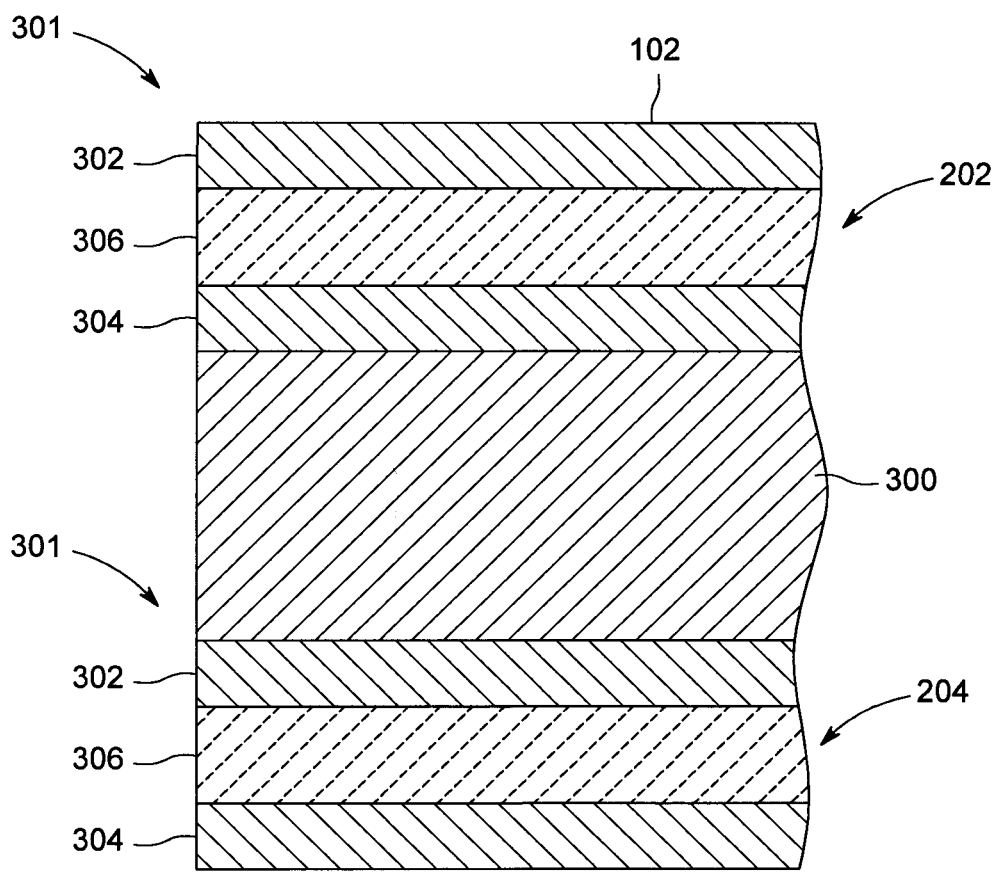
FIG. 3 is a partial cross-sectional schematic view of a dual bimorph synthetic jet assembly that may be used in the compressor shown in FIG. 1.

FIG. 3 is a partial cross-sectional schematic view of synthetic jet assembly 102 that may be used in compressor 100 (shown in FIG. 1). Each synthetic jet assembly 102 includes first plate 202 and second plate 204 that together define a fluid cavity 300. Each of first plate 202 and second plate 204 include a dual bimorph piezoelectric structure 301 having a first piezoelectric layer 302, a second piezoelectric layer 304, and a substrate layer 306. First piezoelectric layer 302 and second piezoelectric layer 304 have opposite polarities. When controller 106 (shown in FIG. 1) actuates the dual piezoelectric structure by applying a voltage to first piezoelectric layer 302 and second piezoelectric layer 304, one of first piezoelectric layer 302 and second piezoelectric layer 304 expands and the other contracts as a result of the opposing polarities. This causes dual bimorph piezoelectric structure 301 and the plate 202, 204 in which it is included to deform thereby increasing or decreasing the volume of fluid cavity 300 depending on the voltage applied. In response to a voltage of opposite polarity, the bimorph piezoelectric structure 301 and the plate 202, 204 in which it is included deforms in the opposite direction.

Controller 106 (shown in FIG. 1) applies voltage to dual bimorph piezoelectric structures 301 of first plate 202 and second plate 204 to draw in, compress, and expel fluid. For example, and without limitation, controller 106 applies a first voltage to the dual piezoelectric structures in first plate 202 and second plate 204. First plate 202 and second plate 204 include first piezoelectric layers 302 and second piezoelectric layers 304 oriented such that their polarities result in first plate 202 deforming concavely with respect fluid cavity 300 and second plate 204 deforming concavely with respect to fluid cavity 300 when the first voltage is applied. This causes fluid cavity 300 to increase in volume in comparison to a resting state in which no voltage is applied. The expansion of the volume of fluid cavity 300 results in fluid being drawn into fluid cavity 300 from fluid source 200 (shown in FIG. 2) or from another synthetic jet assembly 102. Controller 106 applies a second voltage to the dual piezoelectric structures in first plate 202 and second plate 204. The second voltage has an opposite polarity to the first voltage. Due to the opposite polarity of the second voltage, first piezoelectric layer 302 and second piezoelectric layer 304 of first plate 202 and second plate 204 cause first plate 202 and second plate 204 to deform convexly with respect to fluid cavity. This causes fluid cavity 300 to decrease in volume in comparison to the resting state in which no voltage is applied. The reduction in volume results in the compression of the fluid within fluid cavity 300 and the expulsion of the fluid from synthetic jet assembly 102. The fluid is expelled into another synthetic jet assembly 102 or out of compressor 100.

Figure 4:
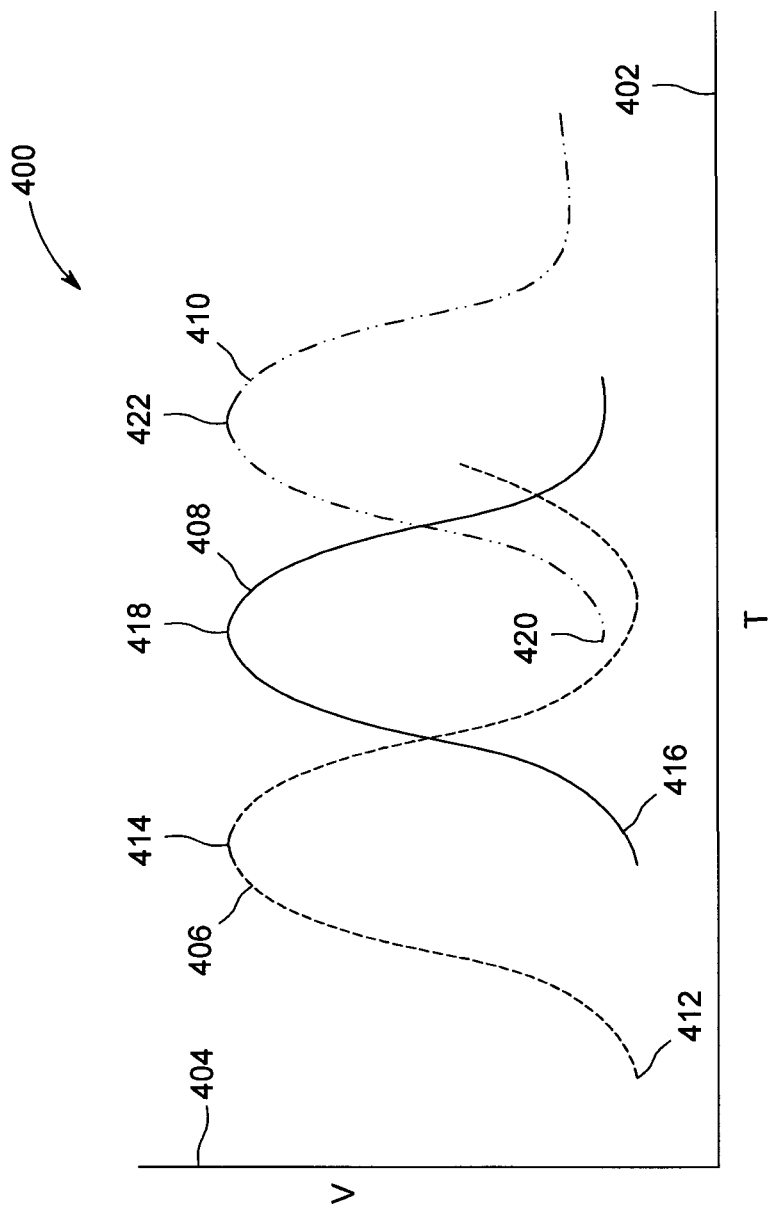
FIG. 4 is an exemplary graphical view of voltage versus time for a plurality of dual bimorph synthetic jet assemblies of the compressor shown in FIG. 1.

FIG. 4 is an exemplary graphical view, i.e., graph 400 of voltage versus time for fluid cavities 300 (shown in FIG. 3) of first synthetic jet assembly 108, second synthetic jet assembly 110, and third synthetic jet assembly 112 (all shown in FIG. 1). Graph 400 shows the actuation of first synthetic jet assembly 108, second synthetic jet assembly 110, and third synthetic jet assembly 112 by controller 106 (shown in FIG. 1) out of phase with each other synthetic jet assembly 102. Graph 400 includes a unitless x-axis 402 representative of time. Graph 400 further includes a unitless y-axis 404 representative of the voltage applied to the various piezoelectric structures of first synthetic jet assembly 108, second synthetic jet assembly 110, and third synthetic jet assembly 112 as described in more detail below. First plot 406 corresponds to the voltage applied to first piezoelectric layer 302 and second piezoelectric layer 304 of first synthetic jet assembly 108 as the voltage applied changes over time. Second plot 408 corresponds to the voltage applied to first piezoelectric layer 302 and second piezoelectric layer 304 of second synthetic jet assembly 110. Third plot 410 corresponds to the voltage applied to first piezoelectric layer 302 and second piezoelectric layer 304 of third synthetic jet assembly 112. Graph 400 depicts a single compression cycle of compressor 100 (shown in FIG. 1). More specifically, at first point 412, controller 106 applies a voltage to dual bimorph piezoelectric structures 301 (shown in FIG. 3) of first synthetic jet assembly 108 that causes fluid cavity 300 of first synthetic jet assembly 108 to expand. This causes the volume of fluid cavity 300 of first synthetic jet assembly 108 to increase to its maximum value as the voltage approaches its maximum value at second point 414. Between first point 412 and second point 414, first synthetic jet assembly 108 draws in fluid. At second point 414, controller 106 applies a second voltage to dual bimorph piezoelectric structures 301 of first synthetic jet assembly 108 that causes fluid cavity 300 of first synthetic jet assembly 108 to contract and compress the fluid.

At third point 416, controller 106 applies a voltage to dual bimorph piezoelectric structures 301 of second synthetic jet assembly 110 that causes fluid cavity 300 of second synthetic jet assembly 110 to expand. This causes the volume of fluid cavity 300 of second synthetic jet assembly 110 to increase to its maximum value as the voltage approaches its maximum value at fourth point 418. Between third point 416 and fourth point 418, second synthetic jet assembly 110 draws in fluid from first synthetic jet assembly 108. The contraction of fluid cavity 300 of first synthetic jet assembly 108 at least partially overlaps in time with the expansion of fluid cavity 300 of second synthetic jet assembly 110. This overlap facilitates the movement of the fluid from first synthetic jet assembly 108 into second synthetic jet assembly 110. At fourth point 418, controller 106 applies a second voltage to dual bimorph piezoelectric structures 301 of second synthetic jet assembly 110 that causes fluid cavity 300 of second synthetic jet assembly 110 to contract and compress the fluid.

At fifth point 420, controller 106 applies a voltage to dual bimorph piezoelectric structures 301 of third synthetic jet assembly 112 that causes fluid cavity 300 of third synthetic jet assembly 112 to expand. This causes the volume of fluid cavity 300 of third synthetic jet assembly 112 to increase to its maximum value as the voltage approaches its maximum value at sixth point 422. Between fifth point 420 and sixth point 422, third synthetic jet assembly 112 draws in fluid from second synthetic jet assembly 110. The contraction of fluid cavity 300 of second synthetic jet assembly 110 at least partially overlaps in time with the expansion of fluid cavity 300 of third synthetic jet assembly 112. This overlap facilitates the movement of the fluid from second synthetic jet assembly 110 into third synthetic jet assembly 112. At sixth point 422, controller 106 applies a second voltage to dual bimorph piezoelectric structures 301 of third synthetic jet assembly 112 that causes fluid cavity 300 of third synthetic jet assembly 112 to contract and compress the fluid. As a result of the successive compression of the fluid by first synthetic jet assembly 108, second synthetic jet assembly 110, and third synthetic jet assembly 112, the pressure of the fluid is increased by compressor 100. In alternative embodiments, compressor 100 includes a different number of and/or different arrangement of synthetic jet assemblies 102. The synthetic jet assemblies can be actuated out of phase similar to the depiction in graph 400, actuated in phase, or otherwise controlled by controller 106.

Figure 5:
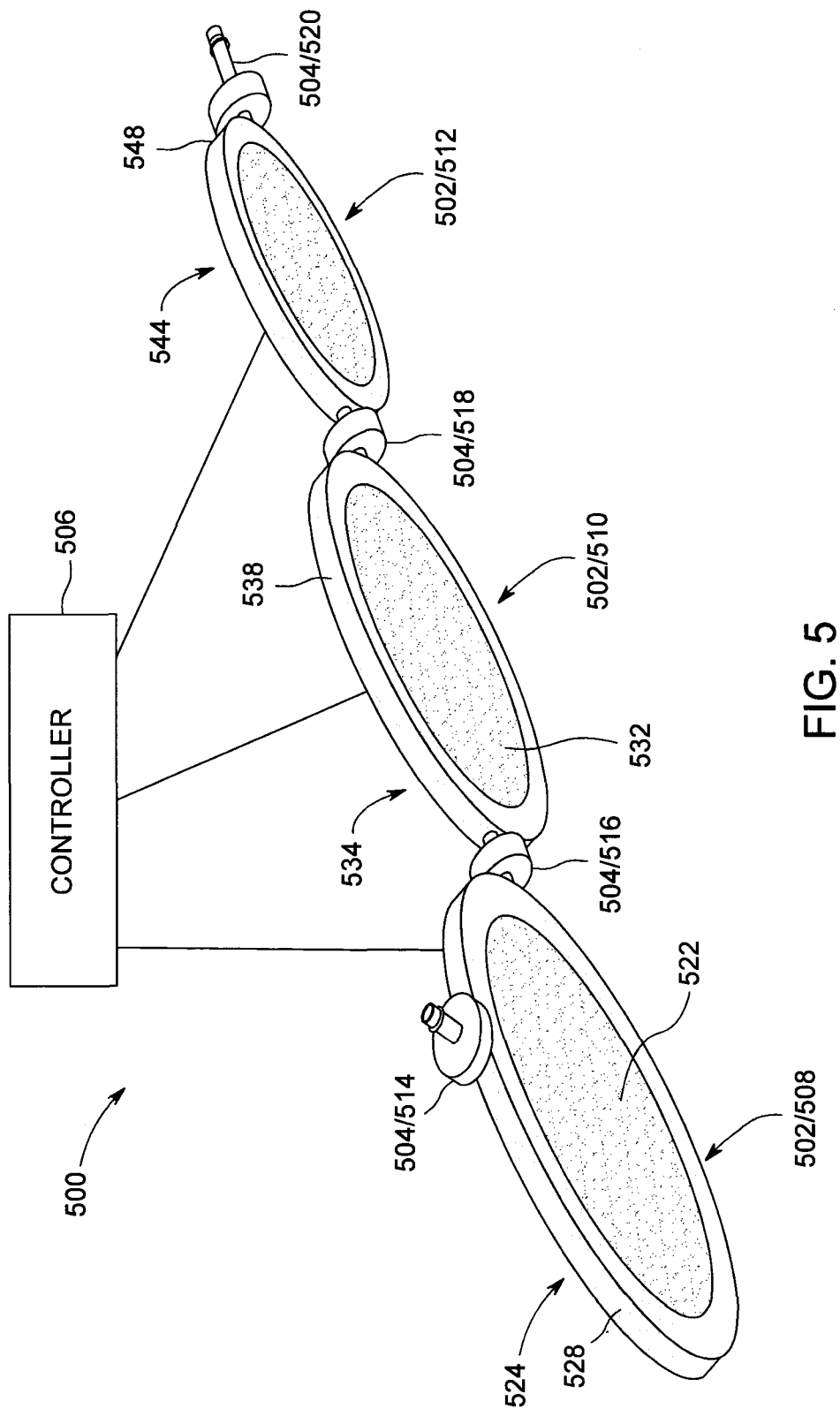
FIG. 5 is a schematic perspective view of an alternative compressor including dual bimorph synthetic jet assemblies.
Figure 6:
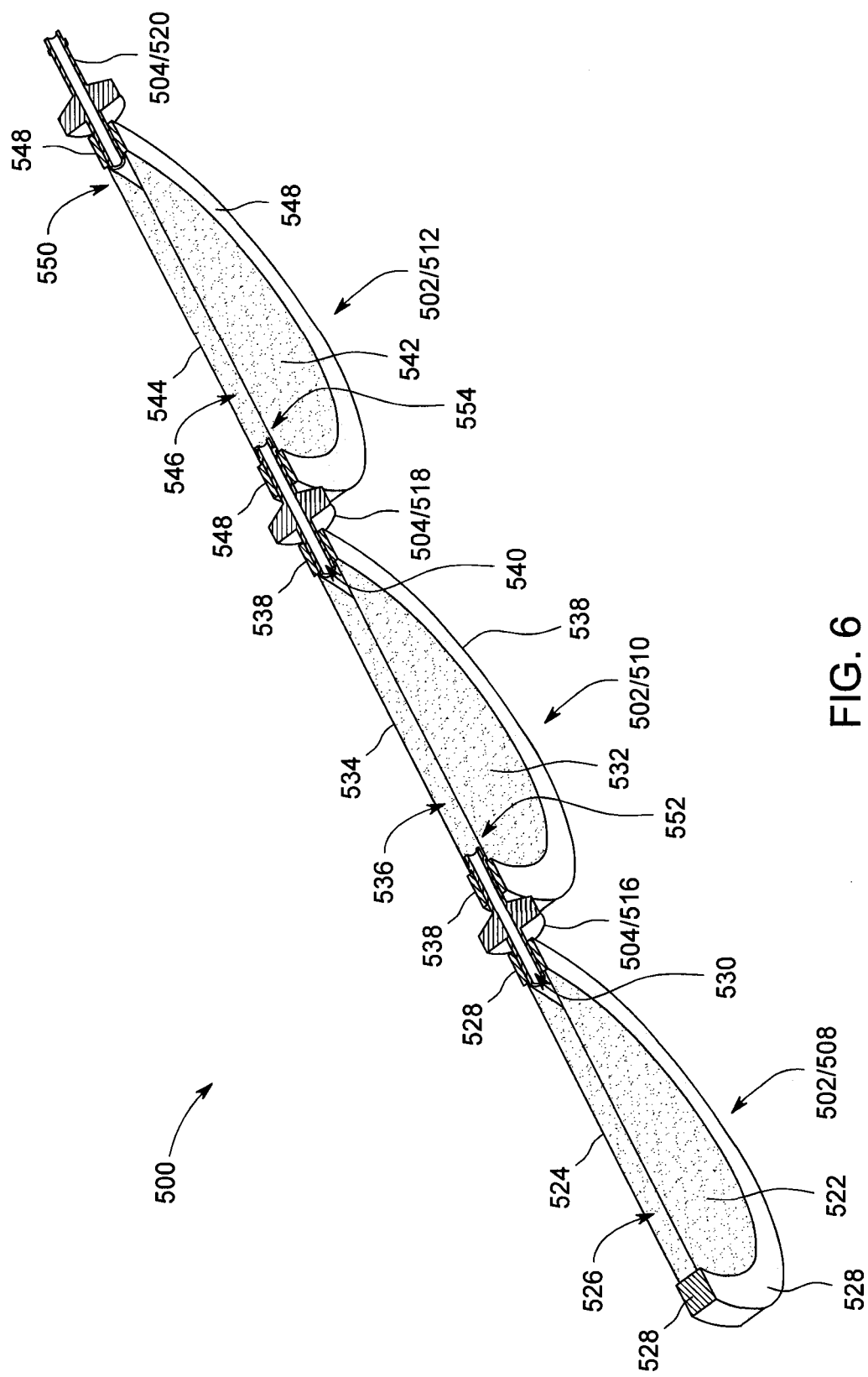
FIG. 6 is a schematic perspective cutaway view of the alternative compressor shown in FIG. 5.

FIG. 5 is a schematic perspective view of an alternative compressor 500 including a plurality of dual bimorph synthetic jet assemblies 502 and FIG. 6 is a schematic perspective cutaway view of alternative compressor 500. Dual bimorph synthetic jet assemblies 502 are similar to dual bimorph jet assemblies 102 (shown in FIGS. 1 and 2) and are described in greater detail with reference to FIG. 2. Each synthetic jet assembly 502 includes a plurality of dual bimorph piezoelectric structures that, when actuated, cause synthetic jet assembly 502 to draw in a fluid, compress the fluid, and expel the fluid in a bellows like manner. Compressor 500 further includes a plurality of flow control devises 504, e.g., and without limitation, flow control orifice assemblies 504. Flow control orifice assemblies 504 facilitate flow of the fluid through successive synthetic jet assemblies 502. For example, flow control orifice assemblies 504 facilitate prevention of backflow of the fluid through compressor 500.

Compressor 500 further includes a controller 506. Controller 506 is electrically coupled to each synthetic jet assembly 502. Controller 506 actuates the plurality of dual bimorph piezoelectric structures of synthetic jet assemblies 502 to draw in, compress, and expel the fluid from synthetic jet assembly 502 through actuation of the dual bimorph piezoelectric structures. As described in greater detail with reference to FIG. 4, controller 506 actuates the dual bimorph piezoelectric structures of each synthetic jet assembly 502 at least partially out of phase with each other synthetic jet assembly 502 to successively compress the fluid.

In this alternative embodiment, compressor 500 includes a first synthetic jet assembly 508, a second synthetic jet assembly 510, and a third synthetic jet assembly 512. First synthetic jet assembly 508 is coupled to a first flow control orifice assembly 514. First flow control orifice assembly 514 is in fluid communication with fluid source 200 (shown in FIG. 2). For example, and without limitation, first flow control orifice assembly 514 is open to the atmosphere. First synthetic jet assembly 508 draws in the fluid through flow control orifice assembly 514. First flow control orifice assembly 514 is oriented to facilitate flow of the fluid from fluid source 200 and into first synthetic jet assembly 508. This orientation further restricts flow of the fluid from first synthetic jet assembly 508 to fluid source 200. First flow control orifice assembly 514 restricts backflow of the fluid within compressor 500.

First synthetic jet assembly 508 is further coupled to a second flow control orifice assembly 516. Second flow control orifice assembly 516 is further coupled to second synthetic jet assembly 510. First synthetic jet assembly 508 expels compressed fluid through second flow control orifice assembly 516. Second flow control orifice assembly 516 is oriented to facilitate flow of the fluid from first synthetic jet assembly 508 and into second synthetic jet assembly 510. This orientation further restricts flow of the fluid from second synthetic jet assembly 510 to first synthetic jet assembly 508. Second flow control orifice assembly 516 restricts backflow of the fluid within compressor 500.

Second synthetic jet assembly 510 is further coupled to a third flow control orifice assembly 518. Third flow control orifice assembly 518 is further coupled to third synthetic jet assembly 512. Second synthetic jet assembly 510 expels compressed fluid through third flow control orifice assembly 518. Third flow control orifice assembly 518 is oriented to facilitate flow of the fluid from second synthetic jet assembly 510 and into third synthetic jet assembly 512. This orientation further restricts flow of the fluid from third synthetic jet assembly 512 to second synthetic jet assembly 510. Third flow control orifice assembly 518 prevents backflow of the fluid within compressor 500. Third synthetic jet assembly 512 expels the compressed fluid from compressor 500 through a fourth flow control orifice assembly 520. Fourth flow control orifice assembly 520 is oriented to facilitate flow of the fluid from third synthetic jet assembly 512 and compressor 500. This orientation further restricts flow of the fluid from the exit of compressor 500 back into third synthetic jet assembly 512.

In the exemplary embodiment, first synthetic jet assembly 508 compresses the fluid and feeds the compressed fluid into second synthetic jet assembly 510. Second synthetic jet assembly 510 further compresses the fluid and feeds the further compressed fluid into third synthetic jet assembly 512. Third synthetic jet assembly 512 further compresses the fluid and expels the further compressed fluid. Synthetic jet assemblies 502 are in a serial relationship and reduce in size from first synthetic jet assembly 508 to third synthetic jet assembly 512. As described herein in greater detail with reference to FIG. 2, each synthetic jet assembly 502 defines a fluid cavity in which the fluid is compressed. The fluid cavity is defined by two plates, each including a dual bimorph piezoelectric structure. The plates are configured to draw in, compress, and expel the fluid from the fluid cavity, and such plates are described above with respect to FIG. 2, and are also described further below.

First synthetic jet assembly 508 has a first fluid cavity 526 having a first volume, second synthetic jet assembly 510 has a second fluid cavity 536 having a second volume, and third synthetic jet assembly 512 has a third fluid cavity 546 a third volume. The first volume is larger than the second volume, and the second volume is larger than the third volume. Each synthetic jet assembly 502 draws in the fluid at a progressively higher initial pressure thereby producing a steadily increasing pressure as the fluid moves from first synthetic jet assembly 508 to second synthetic jet assembly 510 and from second synthetic jet assembly 510 to third synthetic jet assembly 512.

In other embodiments, compressor 500 has alternative configurations including synthetic jet assemblies 502. Compressor 500 can include any number of synthetic jet assemblies 502 greater than one. Compressor 500 can further include synthetic jet assemblies 502 coupled in only a serial relationship, coupled in a parallel relationship, or include synthetic jet assemblies 502 in a combination of serial relationships and parallel relationships. Compressor 500 can include synthetic jet assemblies 502 of varying sizes. Compressor 500 can include one or more synthetic jet assemblies 502 having a greater volume following one or more synthetic jet assemblies 502 having a lesser volume. Compressor 500 can be arranged in many configurations to fit a wide variety of applications. Compressor 500 is scalable both in output pressure by increasing the length of the sequence of synthetic jet assemblies 502 and is scalable in total flow volume by adding parallel sequences of synthetic jet assemblies.

In this alternative embodiment, first synthetic jet assembly 508 includes a first side plate 522 that includes a first bimorph piezoelectric structure 301 (shown in FIG. 3). First synthetic jet assembly 508 also includes a second side plate 524 that includes a second bimorph piezoelectric structure 301 (shown in FIG. 3). First side plate 522 and second side plate 524 partially define a first fluid cavity 526 extending between first side plate 522 and second side plate 524. First synthetic jet assembly 508 further includes a first end plate 528 that defines a first orifice cavity 530 configured to receive second flow control orifice assembly 516, where first orifice cavity 530 and second flow control orifice assembly 516 are in fluid communication with first fluid cavity 526. First end plate 528 is coupled to, and extends circumferentially about, first side plate 522 and second side plate 524, where first end plate 528 at least partially defines first fluid cavity 526.

In addition, second synthetic jet assembly 510 includes a third side plate 532 that includes a third bimorph piezoelectric structure 301 (shown in FIG. 3). Second synthetic jet assembly 510 also includes a fourth side plate 534 that includes a fourth bimorph piezoelectric structure 301. Third side plate 532 and fourth side plate 534 partially define a second fluid cavity 536 extending between third side plate 532 and fourth side plate 534. Second synthetic jet assembly 510 further includes a second end plate 538 that defines a second orifice cavity 540 configured to receive second flow control orifice assembly 516 and third flow control orifice assembly 518, where second orifice cavity 540 and third flow control orifice assembly 518 are in fluid communication with second fluid cavity 536. Second end plate 538 is coupled to, and extends circumferentially about, third side plate 532 and fourth side plate 534, where second end plate 538 at least partially defines second fluid cavity 536

Further, third synthetic jet assembly 512 includes a fifth side plate 542 that includes a fifth bimorph piezoelectric structure 301 (shown in FIG. 3). Third synthetic jet assembly 512 also includes a sixth side plate 544 that includes a sixth bimorph piezoelectric structure 301. Fifth side plate 542 and sixth side plate 544 partially define a third fluid cavity 546 extending between fifth side plate 542 and sixth side plate 544. Third synthetic jet assembly 512 further includes a third end plate 548 that defines a third orifice cavity 550 configured to receive third flow control orifice assembly 518 and fourth flow control orifice assembly 520, where third orifice cavity 550 and fourth flow control assembly 520 are in fluid communication with third fluid cavity 546. Third end plate 548 is coupled to, and extends circumferentially about, fifth side plate 542 and sixth side plate 544, where third end plate 548 at least partially defines third fluid cavity 546

Moreover, second end plate 538 receives second flow control orifice assembly 516 at a fourth orifice cavity 552 defined by second end plate 538. Similarly, third end plate 548 receives third flow control orifice assembly 518 at a fifth orifice cavity 554 defined by third end plate 548.

In this alternative embodiment, controller 506 is coupled to first synthetic jet assembly 508, said second synthetic jet assembly 510, and third synthetic jet assembly 512. Controller 506 is programmed to actuate first synthetic jet assembly 508 at least partially out of phase with second synthetic jet assembly 510 and third synthetic jet assembly 512. Controller 506 is also programmed to actuate second synthetic jet assembly 510 at least partially out of phase with first synthetic jet assembly 508 and third synthetic jet assembly 512. Controller 506 is further programmed actuate third synthetic jet assembly 512 at least partially out of phase with first synthetic jet assembly 508 and second synthetic jet assembly 510.

Embodiments of the compressor, as described above, enable the compression of a fluid. More specifically, the compressor allows for increased service life of the compressor in comparison to compressors including moving and friction generating parts such as motors and pistons, and the compressor allows for an increased number of configurations in which the compressor can be packaged in comparison to compressors including moving and friction generating parts such as motors and pistons.

An exemplary technical effect of the compressor described herein includes at least one of: (a) drawing in, compressing, and expelling a fluid using a plurality of synthetic jet assemblies; (b) increasing the service life of a compressor by reducing the number of moving parts; and (c) increasing the number of configurations in which a compressor can be packaged by reducing the number of moving parts.

Exemplary embodiments of compressor and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where compressing a fluid is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressor comprising:
   a plurality of synthetic jet assemblies, each synthetic jet assembly of said plurality of synthetic jet assemblies in fluid communication with at least one other synthetic jet assembly of said plurality of synthetic jet assemblies, each synthetic jet assembly of said plurality of synthetic jet assemblies comprising:
      a first side plate comprising a first bimorph piezoelectric structure; and
      a second side plate comprising a second bimorph piezoelectric structure, said first side plate and said second side plate defining a first fluid cavity extending between said first side plate and said second side plate; and
   a check valve, said check valve coupled to a first synthetic jet assembly of said plurality of synthetic jet assemblies, said check valve further coupled to a second synthetic jet assembly of said plurality of synthetic jet assemblies, said check valve oriented to facilitate flow of a fluid from said first synthetic jet assembly to said second synthetic jet assembly, said check valve further oriented to restrict flow of the fluid from said second synthetic jet assembly to said first synthetic jet assembly.

2. The compressor in accordance with claim 1, wherein each synthetic jet assembly of said plurality of synthetic jet assemblies is coupled to at least one other synthetic jet assembly of said plurality of synthetic jet assemblies in a serial relationship.

3. The compressor in accordance with claim 1, wherein each synthetic jet assembly of said plurality of synthetic jet assemblies is coupled to at least one other synthetic jet assembly of said plurality of synthetic jet assemblies in a parallel relationship.

4. The compressor in accordance with claim 1, wherein:
   said plurality of synthetic jet assemblies includes a first synthetic jet assembly of said plurality of synthetic jet assemblies coupled to at least one other synthetic jet assembly of said plurality of synthetic jet assemblies in a serial relationship; and
   said plurality of synthetic jet assemblies includes a second synthetic jet assembly of said plurality of synthetic jet assemblies coupled to at least one other synthetic jet assembly of said plurality of synthetic jet assemblies in a parallel relationship.

5. A compressor comprising:
   a plurality of synthetic jet assemblies, each synthetic jet assembly of said plurality of synthetic jet assemblies in fluid communication with at least one other synthetic jet assembly of said plurality of synthetic jet assemblies, each synthetic jet assembly of said plurality of synthetic jet assemblies comprising:
      a first side plate comprising a first bimorph piezoelectric structure; and
      a second side plate comprising a second bimorph piezoelectric structure, said first side plate and said second side plate defining a first fluid cavity extending between said first side plate and said second side plate; and
   a controller coupled to each synthetic jet assembly of said plurality of synthetic jet assemblies, said controller programmed to actuate said each synthetic jet assembly at least partially out of phase with said each synthetic jet assembly to successively compress a fluid in successive synthetic jet assemblies of said plurality of synthetic jet assemblies.

6. A compressor comprising:
   a first flow control orifice assembly; and
   a first synthetic jet assembly comprising:
      a first side plate comprising a first bimorph piezoelectric structure; and
      a second side plate comprising a second bimorph piezoelectric structure, said first side plate and said second side plate defining a first fluid cavity extending between said first side plate and said second side plate, said first synthetic jet assembly further comprising a first end plate defining a first orifice cavity configured to receive said first flow control orifice assembly, said first flow control orifice assembly coupled in fluid communication with said first fluid cavity.

7. The compressor in accordance with claim 6 further comprising:
   a second flow control orifice assembly; and
   a second synthetic jet assembly coupled to said first synthetic jet assembly, said second synthetic jet assembly comprising:
      a third side plate comprising a third bimorph piezoelectric structure; and
      a fourth side plate comprising a fourth bimorph piezoelectric structure, said third side plate and said fourth side plate defining a second fluid cavity extending between said third plate and said fourth side plate, said second synthetic jet assembly further comprising a second end plate defining a second orifice cavity configured to receive said second flow control orifice assembly, said second flow control orifice assembly coupled in fluid communication with said second fluid cavity.

8. The compressor in accordance with claim 7 further comprising:
   a third flow control orifice assembly; and
   a third synthetic jet assembly coupled to said second synthetic jet assembly, said third synthetic jet assembly comprising:
      a fifth side plate comprising a fifth bimorph piezoelectric structure; and
      a sixth side plate comprising a sixth bimorph piezoelectric structure, said fifth side plate and said sixth side plate defining a third fluid cavity extending between said fifth plate and said sixth side plate, said third synthetic jet assembly further comprising a third end plate defining a third orifice cavity configured to receive said third flow control orifice assembly, said third flow control orifice assembly coupled in fluid communication with said third fluid cavity.

9. The compressor in accordance with claim 8, wherein:
   said first flow control orifice assembly is coupled to said first synthetic jet assembly through said first orifice cavity, and said first flow control orifice assembly is coupled to said second synthetic jet assembly through a fourth orifice cavity, said first flow control orifice assembly configured to restrict flow of a fluid between said second synthetic jet assembly and said first synthetic jet assembly;

said second flow control orifice assembly is coupled to said second synthetic jet assembly through said second orifice cavity, and said second flow control orifice assembly is coupled to said third synthetic jet assembly through a fifth orifice cavity, said second flow control orifice assembly configured to restrict flow of a fluid between said third synthetic jet assembly and said second synthetic jet assembly.

10. The compressor in accordance with claim 8 further comprising a fourth flow control orifice assembly coupled to said first synthetic jet assembly, said fourth flow control orifice assembly further coupled to a source of a fluid, said fourth flow control orifice assembly configured to facilitate flow of the fluid from the source to said first synthetic jet assembly, said fourth flow control orifice assembly further configured to restrict flow of the fluid from said first synthetic jet assembly to the source.

11. The compressor in accordance with claim 8, wherein said first fluid cavity has a first uncompressed volume, said second fluid cavity has a second uncompressed volume, and said third fluid cavity has a third uncompressed volume, and wherein the first uncompressed volume is greater than the second uncompressed volume and the second uncompressed volume is greater than the third uncompressed volume.

12. The compressor in accordance with claim 8 further comprising a controller coupled to said first synthetic jet assembly, coupled to said second synthetic jet assembly, and coupled to said third synthetic jet assembly.

13. The compressor in accordance with claim 12, wherein said controller is programmed to:
    actuate said first synthetic jet assembly at least partially out of phase with said second synthetic jet assembly and said third synthetic jet assembly;
    actuate said second synthetic jet assembly at least partially out of phase with said first synthetic jet assembly and said third synthetic jet assembly; and
    actuate said third synthetic jet assembly at least partially out of phase with said first synthetic jet assembly and said second synthetic jet assembly.

14. A method for compressing a fluid, said method comprising:
    drawing the fluid into a first fluid cavity comprising expanding the first fluid cavity of a first synthetic jet assembly;
    compressing the first fluid cavity of the first synthetic jet assembly to compress the fluid;
    drawing the fluid into a second fluid cavity from the first fluid cavity comprising expanding the second fluid cavity of a second synthetic jet assembly;
    restricting the flow of the fluid from the second synthetic jet assembly to the first synthetic jet assembly; and
    compressing the second fluid cavity of the second synthetic jet assembly to compress the fluid.

15. The method in accordance with claim 14, wherein expanding the first fluid cavity comprises:
    actuating, using a controller, a first bimorph piezoelectric structure of a first side plate partially defining the first fluid cavity; and
    actuating, using the controller, a second bimorph piezoelectric structure of a second side plate further partially defining the first fluid cavity.

16. The method in accordance with claim 14, wherein compressing the first fluid cavity comprises:
    actuating, using a controller, a first bimorph piezoelectric structure of a first side plate partially defining the first fluid cavity; and
    actuating a second bimorph piezoelectric structure of a second side plate further partially defining the first fluid cavity.

17. The method in accordance with claim 14 further comprising expanding the second fluid cavity at least partially while compressing the first fluid cavity.

18. The method in accordance with claim 14, wherein expanding the second fluid cavity of the second synthetic jet assembly comprises drawing the fluid through a check valve positioned between the first synthetic jet assembly and the second jet assembly.

19. The method in accordance with claim 14 further comprising:
    drawing the fluid into the third fluid cavity from the second fluid cavity comprising expanding a third fluid cavity of a third synthetic jet assembly; and
    compressing the fluid comprising compressing the third fluid cavity of the third synthetic jet assembly.

20. A method for compressing a fluid, said method comprising:
    drawing the fluid into a first fluid cavity comprising expanding the first fluid cavity of a first synthetic jet assembly;
    compressing the first fluid cavity of the first synthetic jet assembly to compress the fluid;
    drawing the fluid into a second fluid cavity from the first fluid cavity comprising expanding the second fluid cavity of a second synthetic jet assembly; and
    compressing the second fluid cavity of the second synthetic jet assembly to compress the fluid;
    wherein the drawing and compressing of the second fluid cavity is partially out of phase with the drawing and compressing of the first fluid cavity to successively compress the fluid in first and second synthetic jet assemblies.

* * * * *